US007068645B1

(12) United States Patent
Phadnis et al.

(10) Patent No.: US 7,068,645 B1
(45) Date of Patent: Jun. 27, 2006

(54) PROVIDING DIFFERENT QOS TO LAYER-3 DATAGRAMS WHEN TRANSPORTED ON TUNNELS

(75) Inventors: Amit Phadnis, Karnataka (IN); Pankaj Vyas, Karnataka (IN); Praneet Bachheti, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 939 days.

(21) Appl. No.: 09/824,837

(22) Filed: Apr. 2, 2001

(51) Int. Cl.
*H04L 12/66* (2006.01)

(52) U.S. Cl. .................................. 370/352; 370/395.52

(58) Field of Classification Search ........... 370/395.42, 370/395.43, 395.52, 395.65, 395.6, 395.7, 370/395.71, 409, 412, 466, 229, 230, 230.1, 370/231–6, 351–3, 389, 395.1, 397, 399, 370/395.2, 395.21, 395.3, 395.31, 395.4, 370/469–476

See application file for complete search history.

(56) References Cited

U.S. PATENT DOCUMENTS

| | | | | |
|---|---|---|---|---|
| 6,055,236 A | * | 4/2000 | Nessett et al. | 370/389 |
| 6,185,210 B1 | * | 2/2001 | Troxel | 370/395.32 |
| 6,292,839 B1 | * | 9/2001 | Naudus et al. | 709/238 |
| 6,539,483 B1 | * | 3/2003 | Harrison et al. | 713/201 |
| 6,611,522 B1 | * | 8/2003 | Zheng et al. | 370/395.21 |
| 6,631,122 B1 | * | 10/2003 | Arunachalam et al. | 370/332 |
| 6,711,614 B1 | * | 3/2004 | Suzuki | 709/224 |
| 6,747,986 B1 | * | 6/2004 | Charas et al. | 370/465 |
| 6,778,496 B1 | * | 8/2004 | Meempat et al. | 370/230 |
| 6,804,776 B1 | * | 10/2004 | Lothberg et al. | 713/160 |
| 2001/0043571 A1 | * | 11/2001 | Jang et al. | 370/260 |
| 2002/0015395 A1 | * | 2/2002 | Karagiannis | 370/338 |
| 2002/0027925 A1 | * | 3/2002 | Barkai et al. | 370/408 |
| 2003/0007455 A1 | * | 1/2003 | Kohzuki et al. | 370/230.1 |
| 2004/0008706 A1 | * | 1/2004 | Sakamoto et al. | 370/401 |

OTHER PUBLICATIONS

W. Simpson; Entitled, "Request for Comments: 1661- Point to Point Protocol"; Available from www.ietf.org: Jul. 1994; 52 Pages.

Nichols et al.; "Request for Comments: 2474- Definition of the Differentiated Services Field (DS Field) in the IPv4 and IPv6 Headers"; Available from www.ietf.org; Dec. 1998; 20 Pages.

Blake et al; "Request for Comments: 2475- An Architecture for Differentiated Services"; Available from www.ietf.org; Dec. 1998; 36 Pages.

* cited by examiner

*Primary Examiner*—David Vincent
(74) *Attorney, Agent, or Firm*—Narendra R. Thappeta

(57) ABSTRACT

A network device (e.g., network access server or home gateway) providing different QOS (quality of services) to different layer-3 datagrams when transporting on tunnels. A tunnel may be implemented to provide different QOS to different packets depending on the packet header. The network device examines the header of each datagram to determine the specific QOS to be provided. At least the data portion in the datagram is encapsulated for transportation on the tunnel. The encapsulated data portion in turn is encapsulated in the form of one or more packets, with the packet format to reflect the QOS determined for the datagram. When the tunnel is implemented on UDP/IP and the datagram is an IP (Internet protocol) datagram, the TOS/Precedence bits of the IP datagram may be copied into the precedence/TOS bits of the UDP/IP packet(s).

41 Claims, 5 Drawing Sheets

PROVIDING DIFFERENT QOS TO LAYER-3 DATAGRAMS WHEN TRANSPORTED ON TUNNELS

BACKGROUND OF THE INVENTION

1. Field of the Invention

The present invention relates to communication networks, and more specifically to a method and apparatus for providing different quality of services (QOS) to layer-3 (e.g., Internet Protocol) datagrams when transported on tunnels.

2. Related Art

Tunnels are often provided between a pair of network devices at the edge of excommunication networks. In general, tunnels enable the number of virtual circuits to be minimized between the two network devices, thereby minimizing the overhead (e.g., routing table entries, buffers, etc.) on the two network devices and any other network devices in the path of the tunnel. In addition, in case of at least Internet Protocol based communication networks, some of the devices can be assigned non-unique global (i.e., private) IP addresses, and yet enable communication with many systems using the communication network, as is well known in the relevant arts.

Once provided, a tunnel enables datagrams to be transported from one edge of a communication network to the other by encapsulating the datagrams according to a tunneling protocol. L2TP and L2F are two common tunneling protocols well known in the relevant arts. L2TP is described in a document entitled Request for Comment 2661 (RFC 2661) available from www.ietf.org, and the document is incorporated into the present application in its entirety.

A network device receives layer-3 (e.g., Internet Protocol) datagrams from an end system, and sends the data in the datagrams to a peer network device on the other end of a tunnel. The peer network device then sends the data to another end system, and the data transfer may be used to implement network applications between the two end systems.

Network applications often require different services (e.g., latency, bandwidth, reliability of transport, etc.). For example, a real time application (e.g., video-conferencing) may need low latency transport while a batch application (e.g., file transfer) may need large bandwidth even if the latency is high.

In addition, datagrams within an application may require different types of services. For example, an application may be supported by a control flow and it may be desirable to provide reliable and quick transport to the related datagrams. The different services (either desired or provided) while transporting the data are generally referred to as quality of services (QOS).

The QOS desired for each datagram may be specified within the header portion of the datagram. For example, in the case of Internet Protocol (IP), the desired QOS for a datagram are specified by the precedence/type of service (TOS) bits as described in RFC 791, which is incorporated in its entirety into the present application herewith.

It may be desirable to provide the desired QOS to datagrams even when transported on tunnels. For example, a service provider providing a communication network may wish to provide differentiated services on a per-datagram basis and charge the end users (using end systems) according to the desired or offered QOS. The datagrams may be transported on tunnels, for example, to minimize the resource overhead on the network devices in the communication network.

Therefore, what is needed is a method and apparatus which enables different desired QOS to be provided to different datagrams when transported on tunnels.

SUMMARY OF THE INVENTION

A network device provided in accordance with the present invention provides different quality of services to different layer-3 datagrams transported on tunnels. In an embodiment, a tunnel is provisioned between the network device and a peer network device, with the tunnel being implemented to provide different QOS to different packets depending on a packet header for the corresponding packet.

The network device receives a layer-3 datagram and examines the datagram header to determine a QOS to be provided to the layer-3 datagram. The network device may first encapsulate the data in the datagram for transporting on the tunnel. The encapsulated data in turn may be encapsulated in the form of packets. Each packet may contain a packet header to provide the QOS determined by examining the header. The network device then sends the packets to the peer network device on the tunnel. As the packets are encapsulated based on the QOS determined based on the datagram header, each datagram may receive a desired QOS (as indicated by the datagram header).

According to another aspect of the present invention, a service provider may configure the network device to provide different QOS to datagrams received on only desired point-to-point sessions. The packets received only on the desired sessions are provided different QOS. Thus, different end user applications sharing the same point-to-point session may receive differentiated QOS. Accordingly, a service provider may charge different end users differently depending on the offered services.

In one embodiment, a tunnel is provisioned on a virtual circuit (VC) bundle containing multiple VCs. Each VC may be provisioned to provide different QOS. Thus, the packets transporting a datagram may be assigned to one of the VCs depending on the QOS to be provided to the datagram. Accordingly, each datagram may receive the QOS provided by the corresponding assigned VC.

In an alternative embodiment, a tunnel is provisioned using UDP/IP protocol based transport backbone. In case the layer-3 corresponds to IP (Internet Protocol), the TOS (type of service)/precedence bits of the IP datagram may be copied into the same field of the UDP/IP packet supporting the tunnel. Accordingly, the IP datagrams may receive the QOS specified by the TOS/precedence bits indicated by the datagram header.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

A network device in accordance with the present invention provides specific quality of service (QOS) desired for each layer-3 datagram while transporting the datagrams on tunnels. A tunnel may be set up to provide different QOS and the desired QOS for each datagram may be determined by examining the header of the corresponding datagram. The data in each datagram may be transported on a tunnel with a QOS which at least is a closest match of the desired QOS.

The invention is described below with reference to an example environment for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention. Furthermore the invention can be implemented in several other environments.

2. Example Environment

Figure 1:
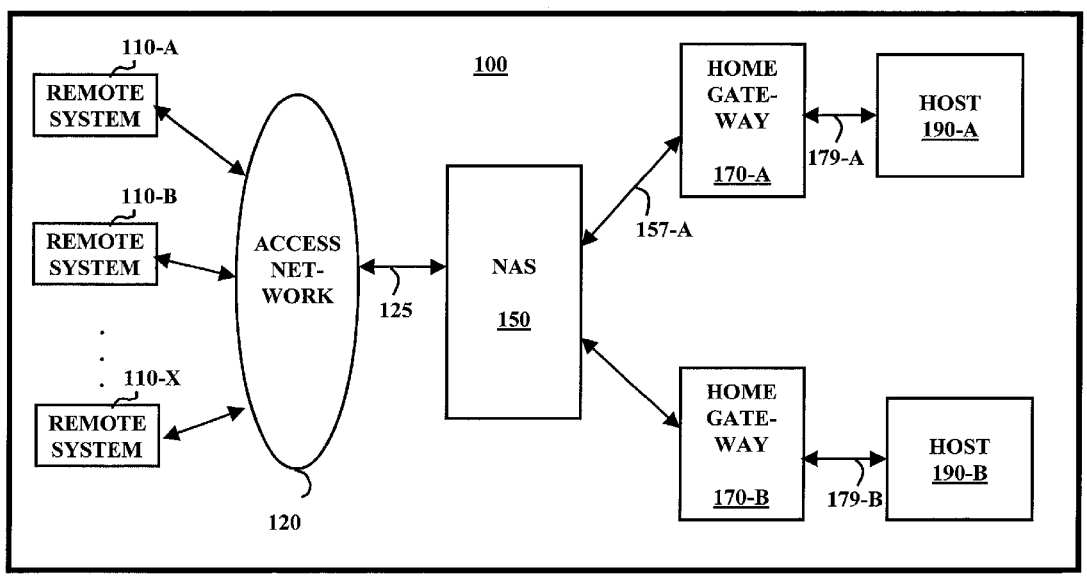
FIG. 1 is a block diagram illustrating an example communication environment in which the present invention can be implemented.

FIG. 1 is a block diagram illustrating an example communication environment 100 in which the present invention can be implemented. Communication environment 100 is shown containing remote systems 110-A through 110-X, access network 120, network access server (NAS) 150, home gateways 170-A and 170-B, and hosts 190-A and 190-B. Access network 120, NAS 150 and home gateways 170-A and 170-B may be together referred to as a communication network providing connectivity between remote systems and target hosts. Each component is described below in further detail.

Remote systems 110-A through 110-X are used by subscribers (or end users) to access hosts of interest. Devices commonly known as customer premise equipment (CPE) and computer systems with modems are examples of remote systems 110-A through 110-X. Each remote system 110-A through 110-X may access a desired host 190-A or 190-B. Remote systems 110-A through 110-X send and receive datagrams consistent with layer-3 protocols according to pre-determined conventions. The data in the datagrams serves as a basis for supporting several user applications between hosts 190-A and 190-B, and remote systems 110-A through 110-X.

Access network 120 provides the electrical and physical interface consistent with the technology (e.g., remote access, Digital Subscriber Line) used by the corresponding remote system. Access network 120 may transport layer-3 datagrams between remote systems and NAS 150. In an embodiment, access network 120 enables a point to point session to be set up between each remote system and the respective home gateway 170-A or 170-B. Backbone path 157-A may contain several intermediate devices (not shown) and can be implemented in a known way.

Network access server (NAS) 150 and home gateways 170-A and 170-B (aggregation devices in general) may be configured to support tunnels on the side of path 157-A, and layer-3 protocols on the other side. NAS 150 may convert layer-3 datagrams into packets (e.g., ATM cells, IP datagrams, and Frame Relay frames) suitable for sending on the earlier provisioned tunnels. The tunnels may be provided with the ability to provide different QOS to different packets. The manner in which the aggregation devices may provide differentiated services to different datagrams is described below in further detail.

3. Method

Figure 2:
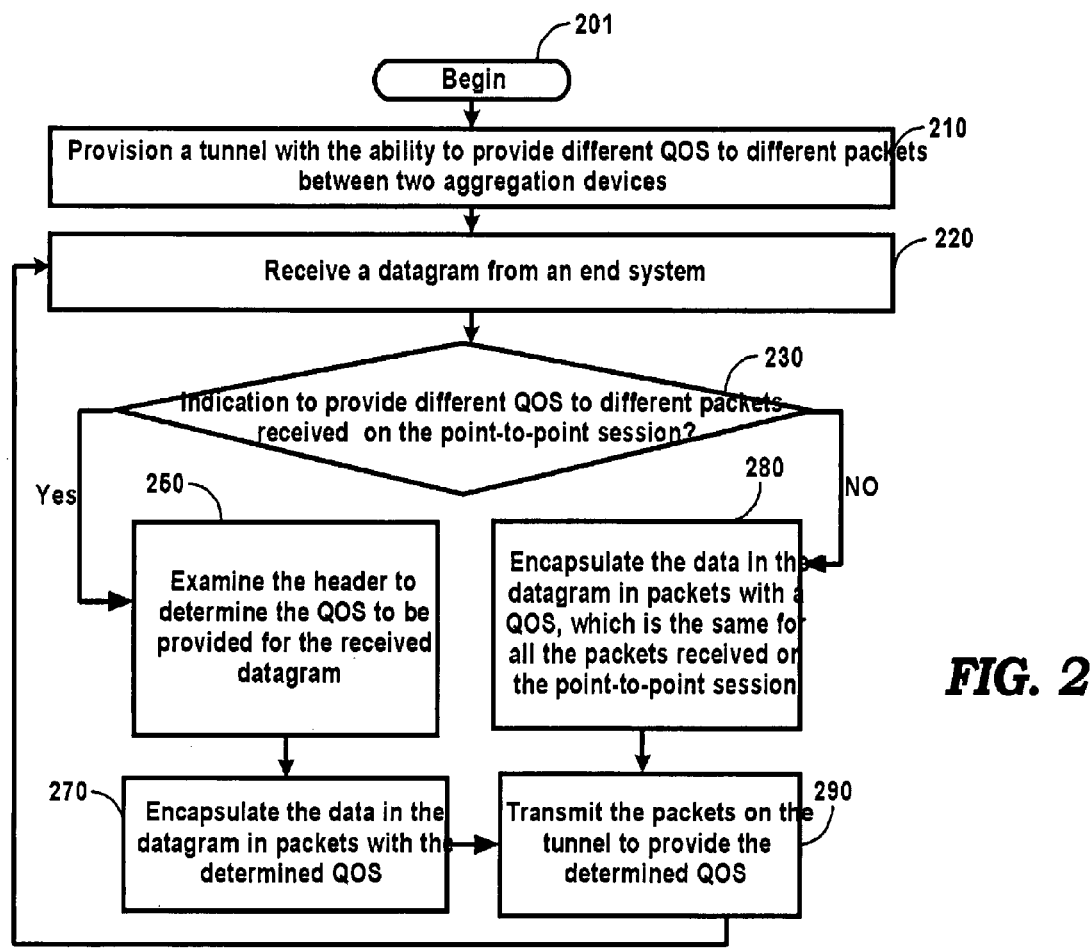
FIG. 2 is a flow chart illustrating a method in accordance with the present invention.

FIG. 2 is a flow chart depicting a method in accordance with the present invention. The method is described with reference to FIG. 1 for illustration. However, the method may be performed in other environments as well. The method starts in step 201, in which control immediately passes to step 210.

In step 210, a tunnel is provisioned with the ability to provide different QOS to different packets transported. Some example approaches of provisioning tunnels providing different QOS are described below with reference to NAS 150 in further detail.

In step 220, NAS 150 may receive a datagram from remote system 110-A. In step 250, NAS 150 may examine the datagram header to determine the QOS to be provided for transporting the data in the received datagram.

In step 270, the data in the datagram is encapsulated to in packets, with the packet header being set to provide the determined QOS. The packets contain the tunnel information in addition. The packet header is determined by the specific protocol implemented on backbone path 157-A. In an example embodiment described below, the tunnels are described as being implemented within UDP/IP protocol stack.

In step 290, the packets are transmitted on backbone path 157-A. As the packet(s) is (are) encapsulated to provide the determined QOS, the datagram received in step 220 is provided the determined QOS when transferred on backbone path 157-A. An embodiment of NAS 150 is described below in further detail.

4. Network Access Server (NAS)

Figure 3:
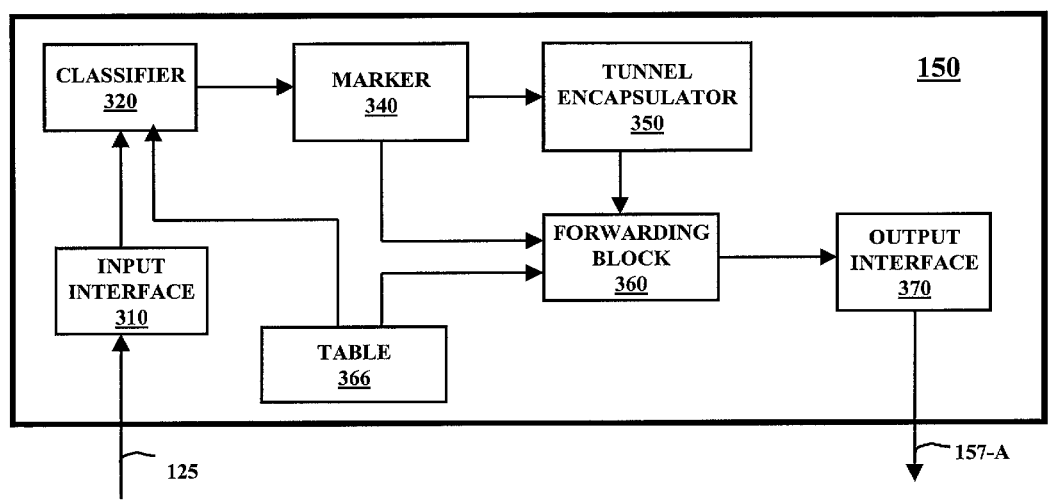
FIG. 3 is a block diagram illustrating the internals of a network access server (NAS) in an embodiment of the present invention.

FIG. 3 is a block diagram illustrating the internals of NAS 150 in an embodiment of the present invention. The embodiment is described in the context of datagrams received on point-to-point sessions (set up between remote system 110-A and home gateway 170-A) and L2TP tunnels implemented using VC bundles (set up between NAS 150 and home gateway 170-A) containing multiple ATM virtual circuits on backbone 157-A.

In general, a VC bundle contains multiple virtual circuits to the same destination network device and network devices (including NAS 150 and home gateway 170-A) may need to maintain a single forwarding (routing) entry for each VC bundle, thereby minimizing the overhead on the network devices. Alternatively, a VC bundle may contain multiple independent virtual circuits which are provisioned between the two end points of the corresponding tunnel sought to be implemented.

Only the details of the technologies as relevant to an understanding of various aspects of the present invention are described in the present application. The reader is referred to the following public documents for further details on the corresponding technology, and all the documents are incorporated in their entirety into the present application:

ATM: Book entitled, "ATM: Theory and Application", ISBN Number: 0-07-060362-6, by David E. McDysan and Darren L. Spohn;

Point-to-point session: RFC 1661, available from www.ieti.org;

Internet Protocol: RFC 791, available from www.ietforg; and

Tunnels: RFC 2661, available from www.ietf.org.

Continuing with reference to FIG. 3, NAS 150 is shown containing input interface 310, classifier 320, marker 340, tunnel encapsulator 350, forwarding block 360, tables 366, and output interface 370. Each component is described below in further detail.

Each component of network access server 150 may be implemented in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing network access server 150 with a desired mix of hardware, software and/or firmware.

Input interface 310 receives layer-3 datagrams (e.g., Internet Protocol) on a point-to-point session ("PPP session") implemented on path 125 and forwards the datagram and PPP session information to classifier 320. In general, input interface 310 provides the electrical and other physical protocol interfaces on path 125, and may be implemented in a known way.

Classifier 320 examines the received datagram to determine the specific session to which the datagram relates to. Classifier 320 may then determine whether to provide per-datagram QOS to the session by examining an entry in table 366 corresponding to the session. Assuming the received datagram is to be provided per-datagram QOS, the datagram is passed to marker 340.

Marker 340 determines the specific QOS to be provided to the received datagram, and marks (i.e., associates) the QOS with the datagram. In the case of IP datagrams, marker 340 may merely use the TOS/precedence bits of the IP header as representing the desired QOS. In an embodiment, if the TOS/precedence bits are determined not have been set, marker 340 may mark the datagram with a default value specified in table 366. Alternatively, in the case of IP datagrams, the datagram can be marked with the same value as in the TOS/precedence field.

Tunnel encapsulator 350 encapsulates the data in the datagram according to a tunneling protocol. The tunnel is set up between NAS 150 and home gateway 170-A in a known way. In an embodiment, tunnel encapsulator 350 is implemented consistent with RFC 2661 noted above.

Table 366 may be configured manually (e.g., using a network management station, not shown) and/or automatically (e.g., virtual circuits using a suitable signaling protocol). Table 366 may specify the specific point-to-point sessions to which per-datagram QOS is to be provided in accordance with the present invention. For some of the point-to-point session, table 366 may specify default QOS to be provided.

In addition, table 366 may contain protocol encapsulation information to provide each type of QOS provided by NAS 150. In one embodiment, a tunnel between NAS 150 and home gateway 170-A is implemented using multiple ATM virtual circuits forming a VC bundle, with each virtual circuit providing a different (set of) QOS. Thus, table 366 may be configured to indicate the specific virtual circuit (e.g., by a virtual circuit identifier) to be used for each QOS. Table 366 may be implemented using a memory. A non-volatile memory (potentially provided external to NAS 150) may be used to store the data permanently, and the data may be loaded into a random access memory (RAM) during the operation of NAS 150 for a superior performance.

Forwarding block 360 receives encapsulated data of each datagram from tunnel encapsulator 350, and encapsulates the data in the form of one or more packets. The packet header may be determined according to the data in table 366. In the case of tunnels implemented on a VC bundle as noted above, forwarding block 360 may retrieve from table 366 a virtual circuit identifier (VCI/VPI) corresponding to the mark received from marker 340, and encapsulates the data (received from tunnel encapsulator 350) in packets using the virtual circuit identifier in the header.

Output interface 370 receives the packets from forwarding block 360, and transmits the received packets on backbone 157-A. Output interface 370 provides the electrical and other physical protocol interfaces with backbone 157-A, and may be implemented in a known way.

Home gateway 170-A receives the packets (e.g., ATM cells in AAL5 format) on the different virtual circuits and supports the point-to-point sessions. Home gateway 170-A may be implemented in a known way. Thus, NAS 150 may be implemented to provide different QOS to different datagrams.

Figure 5:
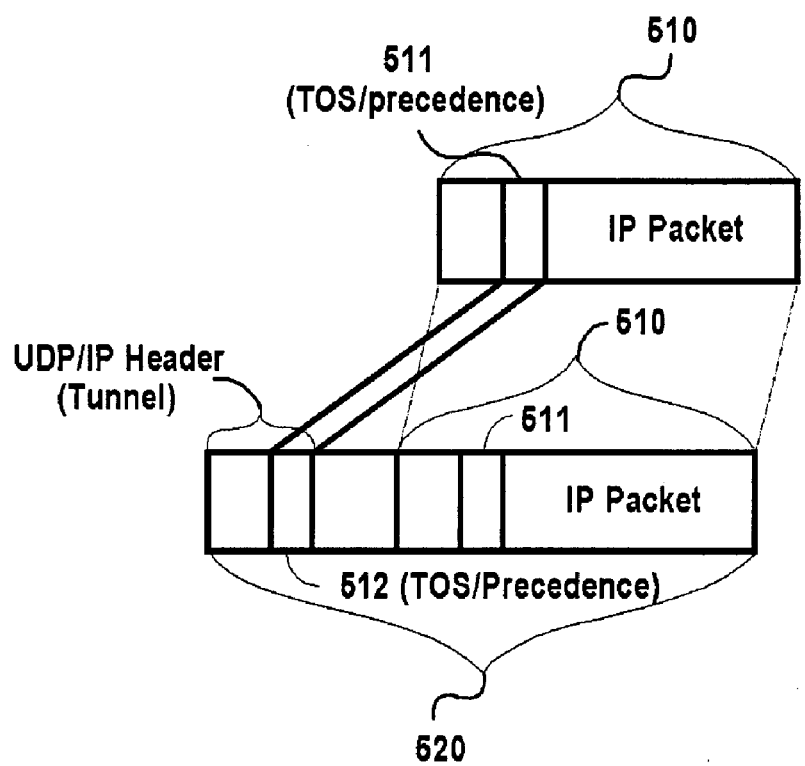
FIG. 5 depicts the manner in which IP packets received on a point-to-point session are sent in a UDP tunnel, while providing differentiated QOS according to an aspect of the present invention.

While the above description is provided with respect to tunnels implemented using VC bundles on ATM backbones, it should be appreciated that alternative embodiments may be implemented using other technologies as described with combined reference to FIGS. 3 and 5. For example, tunnels may be implemented using UDP/IP transport, and in such a case marker 340 may merely provide the bits in TOS/precedence bits to forwarding block 360. In turn, forwarding block 360 may copy the received bits into the TOS/precedence fields of the outer UDP/IP encapsulation as shown by the copying of TOS/precedence field 511 of packet 510 into TOS/precedence field 512 of UDP/IP packet 520 in FIG. 5.

Accordingly, each packet (or datagram) 520 in the UDP/IP tunnel may have the same TOS/precedence bits of the transported packet 510. As the UDP/IP packet 520 in the tunnel may be provided the QOS corresponding to the TOS/precedence bits, the transported datagram may receive desired QOS. Also, as noted above, the components of NAS 150 may be implemented in the form of software also. An example software implementation is described below in further detail.

5. Software Implementation

Figure 4:
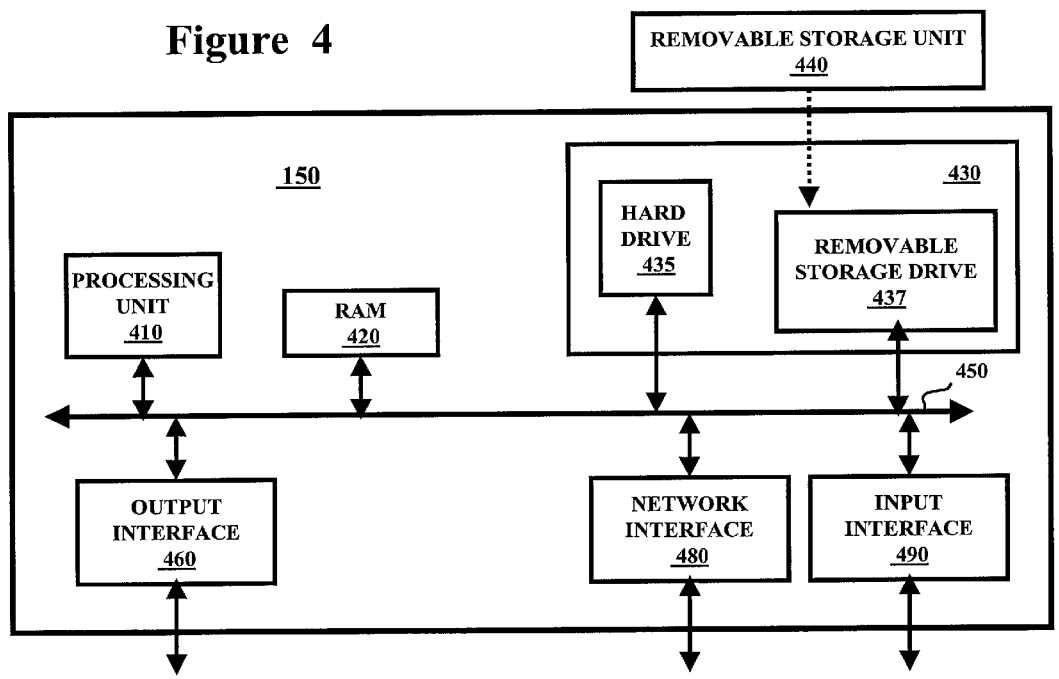
FIG. 4 is a block diagram illustrating the implementation of NAS substantially in software.

FIG. 4 is a block diagram illustrating the details of a network device (e.g., NAS 150) in one embodiment. NAS 150 is shown containing processing unit 410, random access memory (RAM) 420, storage 430, output interface 460, network interface 480 and input interface 490. Each component is described in further detail below.

Output interface 460 provides output signals (e.g., display signals to a display unit, not shown) which can form the basis for a suitable user interface for a user to interact with NAS 150. Input interface 490 (e.g., interface with a keyboard and/or mouse, not shown) enables a user to provide any necessary inputs to NAS 150. Output interface 460 and input interface 490 can be used, for example, to enable configuration of NAS 150 to provide various features of the present invention.

Network interface 480 enables NAS 150 to send and receive data on communication networks using protocols as asynchronous transfer mode (ATM). Network interface 480 may correspond to input interface 310 and output interface 370 of FIG. 3. Network interface 480, output interface 460 and input interface 490 can be implemented in a known way.

RAM 420 and storage 430 may together be referred to as a memory. RAM 420 may receive instructions and data on path 450 from storage 430. Storage 430 may contain units such as hard drive 435 and removable storage drive 437. Storage 430 may store the software instructions and data, which enable NAS 150 to provide several features in accordance with the present invention.

Some or all of the data and instructions may be provided on removable storage unit 440, and the data and instructions may be read and provided by removable storage drive 437 to processing unit 410. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420. In general, Reprocessing unit 410 reads sequences of instructions from various types of memory medium (including RAM 420, storage 430 and removable storage unit 440), and executes the instructions to provide various features of the present invention.

Thus, NAS 150 may be implemented substantially in software to provide different QOS to different datagrams. Home gateway 170-A and other network devices may also be implemented similarly to provide differentiated services as will be apparent to one skilled in the relevant arts by reading the disclosure provided herein. Such other implementations are also contemplated to be within the scope and spirit of the present invention.

Accordingly, a service provider may configure the aggregation devices (NAS 150 and home gateway 170-A in the above embodiments) appropriately and provide different QOS to different datagrams and charge the end user consistent with offered services.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of providing different quality of services (QOS) to different layer-3 datagrams to be transported from a first network device to a second network device connected by a backbone, each of said first network device and said second network device operating as a layer-3 device, said method comprising:

provisioning a tunnel in said first network device, said tunnel terminating at said second network device via said backbone, said tunnel being implemented to provide different QOS to different packets depending on a packet header for the corresponding packet;

indicating in said first network device whether to provide different QOS to different datagrams received on a point-to-point session;

receiving a layer-3 datagram on said point-to-point session in said first network device, said layer-3 datagram containing a datagram header and a datagram data;

examining said datagram header in said first network device to determine a QOS to be provided to said layer-3 datagram, wherein said examining determines to provide different QOS to datagrams received on said point-to-point session based on said indicating;

forming at least one packet in said first network device by encapsulating at least said datagram data with a layer-3 header, wherein said layer-3 header identifies said tunnel to said second network device, said at least one packet containing a packet header to provide said QOS determined by said examining; and sending said at least one packet to said second network device on said tunnel, whereby layer-3 datagrams received on said point-to-point session receive different QOS based on the corresponding datagram headers if said indicating indicates that different QOS are to be provided to different datagrams received on said point-to-point session.

2. The method of claim 1, wherein said backbone is implemented to transport packets according to asynchronous transfer mode (ATM) protocol.

3. The method of claim 2, wherein said provisioning further comprises implementing said tunnel using a plurality of virtual circuits (VC) forming a VC bundle, wherein each of said plurality of virtual circuits provides one of said different QOS provided by said tunnel.

4. The method of claim 2, wherein said at least one packet comprises a plurality of packets, wherein each of said plurality of packets is formed according to said ATM protocol.

5. The method of claim 1, wherein said tunnel is implemented using UDP/IP packets, wherein each UDP/IP packet contains a TOS/Precedence field, said TOS/Precedence field determining the QOS provided to the corresponding UDP/IP packet, said at least one packet comprising a UDP/IP packet, said forming comprising determining the value of said TOS/Precedence field according to said datagram header of said layer-3 datagram.

6. The method of claim 5, wherein said layer-3 datagram comprises an IP datagram, and wherein said forming comprises copying the TOS/precedence bits in said IP datagram to said TOS/precedence field of a UDP/IP packet encapsulating said IP datagram, wherein the header of said UDP/IP packet comprises said layer-3 header.

7. The method of claim 1, further comprising indicating in a table a default QOS to be used with said point-to-point session, wherein said determining comprises associating said default QOS to said layer-3 datagram if said datagram header does not provide an indication of the QOS to be provided to said layer-3 datagram.

8. The method of claim 1, wherein said first network device comprises either a network access server (NAS) or a home gateway.

9. A first network device providing different quality of services (QOS) to different layer-3 datagrams to be transported to a second network device connected by a backbone, each of said first network device and said second network device operating as a layer-3 device, said first network device comprising:

means for provisioning a tunnel terminating at said second network device via said backbone, said tunnel being implemented to provide different QOS to different packets depending on a packet header for the corresponding packet;

means for indicating in said first network device whether to provide different QOS to different datagrams received on a point-to-point session;

means for receiving a layer-3 datagram on said point-to-point session, said layer-3 datagram containing a datagram header and a datagram data;

means for examining said datagram header to determine a QOS to be provided to said layer-3 datagram, wherein said means for examining determines to provide different QOS to datagrams received on said point-to-point session based on said indicating;

means for forming at least one packet by encapsulating at least said datagram data with a layer-3 header, wherein said layer-3 header identifies said tunnel to said second network device, said at least one packet containing a packet header to provide said QOS determined by said examining; and means for sending said at least one packet to said second network device on said tunnel, whereby layer-3 datagrams received on said point-to-point session receive different QOS based on the corresponding datagram headers if said means for indicating indicates that different QOS are to be provided to different datagrams received on said point-to-point session.

10. The first network device of claim 9, wherein said backbone is implemented to transport packets according to asynchronous transfer mode (ATM) protocol, wherein said means for provisioning implements said tunnel using a plurality of virtual circuits (VC) forming a VC bundle, wherein each of said plurality of virtual circuits provides one of said different QOS provided by said tunnel, wherein said at least one packet comprises a plurality of packets, wherein each of said plurality of packets is formed according to said ATM protocol.

11. The first network device of claim 9, wherein said tunnel is implemented using UDP/IP packets, wherein each UDP/IP packet contains a TOS/Precedence field, said TOS/precedence field determining the QOS provided to the corresponding UDP/IP packet, said at least one packet comprising a UDP/IP packet, said means for forming determining the value of said TOS/Precedence field according to said datagram header of said layer-3 datagram.

12. The first network device of claim 11, wherein said layer-3 datagram comprises an IP datagram, and wherein said means for forming copies the TOS/precedence bits in said IP datagram to said TOS/precedence field of a UDP/IP packet encapsulating said IP datagram, wherein the header of said UDP/IP packet comprises said layer-3 header.

13. The first network device of claim 9, further comprising indicating in a table a default QOS to be used with said point-to-point session, wherein said means for determining associates said default QOS to said layer-3 datagram if said datagram header does not provide an indication of the QOS to be provided to said layer-3 datagram.

14. The first network device of claim 9, wherein said first network device comprises either a network access server (NAS) or a home gateway.

15. A first network device providing different quality of services (QOS) to different layer-3 datagrams to be transported to a second network device connected by a backbone, each of said first network device and said second network device operating as a layer-3 device, said first network device comprising:

a memory indicating whether to provide different QOS to different layer-3 datagrams related to a point-to-point session;

an input interface receiving a layer-3 datagram, said layer-3 datagram containing a datagram header and a datagram data;

a classifier determining whether said layer-3 datagram relates to said point-to-point session;

a marker determining a QOS to be provided to said layer-3 datagram, wherein said marker provides different QOS to different layer-3 datagrams only if said memory indicates that different QOS is to be provided to different layer-3 datagrams related to said point-to-point session;

a tunnel encapsulator encapsulating at least said datagram data with a layer-3 header to generate an encapsulated data, said layer-3 header identifies a tunnel set up via a backbone to said second network device, said tunnel providing different QOS to packets having different packet headers;

a forwarding block forming at least one packet to transport said encapsulated data, wherein said encapsulated data is encapsulated for transporting on said tunnel, said at least one packet containing a packet header to provide said QOS determined by said examining; and an output interface sending said at least one packet to said second network device on said tunnel, whereby said first network device provides different QOS to different layer-3 datagrams received only on some point-to-point sessions.

16. The first network device of claim 15, wherein said marker examines said datagram header to determine said QOS.

17. The first network device of claim 16, wherein said layer-3 datagram is received on a point-to-point session.

18. The first network device of claim 17, wherein said packet comprises an ATM cell and said tunnel is implemented using a virtual circuit (VC) bundle containing a plurality of virtual circuits, wherein each of said plurality of virtual circuits is provisioned to provide one of said different QOS provided by said tunnel.

19. The first network device of claim 17, wherein said packet comprises a UDP/IP packet containing a type of service (TOS)/precedence field, wherein said layer-3 datagram comprises an Internet protocol (IP) datagram also containing a TOS/precedence field, said marker providing at least some of the bits of said TOS/precedence field of said IP datagram for copying into said TOS/precedence field of said UDP/IP packet, wherein the header of said UDP/IP packet comprises said layer-3 header.

20. The first network device of claim 17, wherein said memory further indicates a default QOS to be provided to datagrams received on said point-to-point connection, wherein said marker accesses said memory to provide said default QOS to said layer-3 datagram if QOS cannot be determined by examining said packet header.

21. A computer readable medium carrying one or more sequences of instructions for causing a first network device to provide different quality of services (QOS) to different layer-3 datagrams when sending to a second network device on a backbone, said first network device, each of said first network device and said second network device operating as a layer-3 device, said backbone being contained in a communication network, wherein execution of said one or more sequences of instructions by one or more processors contained in said network device causes said one or more processors to perform the actions of:

provisioning a tunnel in said first network device, said tunnel terminating at said second network device via said backbone, said tunnel being implemented to provide different QOS to different packets depending on a packet header for the corresponding packet;

indicating in said first network device whether to provide different QOS to different datagrams received on a point-to-point session;

receiving a layer-3 datagram in said first network device, said layer-3 datagram containing a datagram header and a datagram data;

examining said datagram header in said first network device to determine a QOS to be provided to said layer-3 datagram, wherein said examining determines to provide different QOS to datagrams received on said point-to-point session based on said indicating;

forming at least one packet in said first network device by encapsulating at least said datagram data with a layer-3 header, wherein said layer-3 header identifies said tunnel to said second network device, said at least one packet containing a packet header to provide said QOS determined by said examining; and sending said at least one packet to said second network device on said tunnel, whereby layer-3 datagrams received on said point-to-point session receive different QOS based on the corresponding datagram headers if said indicating indicates that different QOS are to be provided to different datagrams received on said point-to-point session.

22. The computer readable medium of claim 21, wherein said backbone is implemented to transport packets according to asynchronous transfer mode (ATM) protocol.

23. The computer readable medium of claim 22, wherein said provisioning further comprises implementing said tunnel using a plurality of virtual circuits (VC) forming a VC bundle, wherein each of said plurality of virtual circuits provides one of said different QOS provided by said tunnel.

24. The computer readable medium of claim 22, wherein said at least one packet comprises a plurality of packets, wherein each of said plurality of packets is formed according to said ATM protocol.

25. The computer readable medium of claim 21, wherein said tunnel is implemented using UDP/IP packets, wherein each UDP/IP packet contains a TOS/Precedence field, said TOS/Precedence field determining the QOS provided to the corresponding UDP/IP packet, said at least one packet comprising a UDP/IP packet, said forming comprising determining the value of said TOS/Precedence field according to said datagram header of said layer-3 datagram, wherein the header of said UDP/IP packet comprises said layer-3 header.

26. The computer readable medium of claim 25, wherein said layer-3 datagram comprises an IP datagram, and wherein said forming comprises copying the TOS/precedence bits in said IP datagram to said TOS/precedence field of a UDP/IP packet encapsulating said IP datagram.

27. The computer readable medium of claim 21, further comprising indicating in a table a default QOS to be used with said point-to-point session, wherein said determining comprises associating said default QOS to said layer-3 datagram if said datagram header does not provide an indication of the QOS to be provided to said layer-3 datagram.

28. The computer readable medium of claim 21, wherein said first network device comprises either a network access server (NAS) or a home gateway.

29. A communication system comprising:

an access network coupled to a plurality of remote systems, said access network forwarding a layer-3 datagram based on data received from one of said plurality of remote systems, wherein said layer-3 datagram contains a datagram header and a datagram data; and a communication network containing a backbone connecting a first network device and a second network device, each of said first network device and said second network device operating as a layer-3 device, said first network device being operable to:

provision a tunnel terminating at said second network device via said backbone, said tunnel being implemented to provide different QOS to different packets depending on a packet header for the corresponding packet;

indicate in said first network device whether to provide different QOS to different datagrams received on a point-to-point session;

receive said layer-3 datagram, said data header indicating that said layer-3 datagram is to be sent to said second network device;

examine said datagram header in said first network device to determine a QOS to be provided to said layer-3 datagram, wherein said examine determines to provide different QOS to datagrams received on said point-to-point session based on said indicate;

form at least one packet in said first network device by encapsulating at least said datagram data with a layer-3 header, wherein said layer-3 header identifies said tunnel to said second network device, said at least one packet containing a packet header to provide said QOS determined by said examine; and send said at least one packet to said second network device on said tunnel, whereby layer-3 datagrams received on said point-to-point session receive different QOS based on the corresponding datagram headers if said indicating indicates that different QOS are to be provided to different datagrams received on said point-to-point session.

30. The communication network of claim 29, wherein said backbone is implemented to transport packets according to asynchronous transfer mode (ATM) protocol.

31. The communication network of claim 30, wherein said provision further comprises implementing said tunnel using a plurality of virtual circuits (VC) forming a VC bundle, wherein each of said plurality of virtual circuits provides one of said different QOS provided by said tunnel.

32. The communication network of claim 30, wherein said at least one packet comprises a plurality of packets, wherein each of said plurality of packets is formed according to said ATM protocol.

33. The communication network of claim 29, wherein said tunnel is implemented using UDP/IP packets, wherein each UDP/IP packet contains a TOS/Precedence field, said TOS/Precedence field determining the QOS provided to the corresponding UDP/IP packet, said at least one packet comprising a UDP/IP packet, said forming comprising determining the value of said TOS/Precedence field according to said datagram header of said layer-3 datagram, wherein the header of said UDP/IP packet comprises said layer-3 header.

34. The communication network of claim 33, wherein said layer-3 datagram comprises an IP datagram, and wherein said forming comprises copying the TOS/precedence bits in said IP datagram to said TOS/precedence field of a UDP/IP packet encapsulating said IP datagram.

35. The communication network of claim 29, wherein first network device is further operable to indicate in a table a default QOS to be used with said point-to-point session, wherein said determine comprises associating said default QOS to said layer-3 datagram if said datagram header does not provide an indication of the QOS to be provided to said layer-3 datagram.

36. The communication network of claim 29, wherein said first network device comprises either a network access server (NAS) or a home gateway.

37. The method of claim 1, wherein said indicating in said first network device indicates that different QOS are to be provided to different datagrams received on a first point-to-point session and that different QOS are not to be provided to different datagrams received on a second point-to-point session,
- wherein said first network device sends a first packet and a second packet with different QOS, wherein said first packet and said second packet contain data received on said first point-to-point session,
- wherein said first network device sends a third packet and a fourth packet with the same QOS, wherein said third packet and said fourth packet contain data received on said second point-to-point session.

38. The first network device of claim 9, wherein said means for indicating indicates that different QOS are to be provided to different datagrams received on a first point-to-point session and that different QOS are not to be provided to different datagrams received on a second point-to-point session,
- wherein said means for sending sends a first packet and a second packet with different QOS, wherein said first packet and said second packet contain data received in datagrams on said first point-to-point session,
- wherein said means for sending sends a third packet and a fourth packet with the same QOS, wherein said third packet and said fourth packet contain data received in datagrams on said second point-to-point session.

39. The first network device of claim 15, wherein said memory indicates that different QOS are to be provided to different datagrams received on a first point-to-point session and that different QOS are not to be provided to different datagrams received on a second point-to-point session,
- wherein said marker determines that different QOS are to be provided to a first datagram and a second datagram received on said first point-to-point session,
- wherein said marker determines that the same QOS is to be provided to a third datagram and a fourth datagram received on said second point-to-point session,
- wherein the QOS provided to packets transporting data related to said first datagram is not identical to packets transporting data related to said second datagram,
- and wherein the QOS provided to packets transporting data related to said third datagram is identical to packets transporting data related to said fourth datagram.

40. The computer readable medium of claim 21, wherein said indicating indicates that different QOS are to be provided to different datagrams received on a first point-to-point session and that different QOS are not to be provided to different datagrams received on a second point-to-point session,
- wherein said first network device sends a first packet and a second packet with different QOS, wherein said first packet and said second packet contain data received on said first point-to-point session,
- wherein said first network device sends a third packet and a fourth packet with the same QOS, wherein said third packet and said fourth packet contain data received on said second point-to-point session.

41. The communication network of claim 29, wherein said indicate indicates that different QOS are to be provided to different datagrams received on a first point-to-point session and that different QOS are not to be provided to different datagrams received on a second point-to-point session,
- wherein said first network device sends a first packet and a second packet with different QOS, wherein said first packet and said second packet contain data received on said first point-to-point session,
- wherein said first network device sends a third packet and a fourth packet with the same QOS, wherein said third packet and said fourth packet contain data received on said second point-to-point session.

* * * * *

UNITED STATES PATENT AND TRADEMARK OFFICE
CERTIFICATE OF CORRECTION

PATENT NO. : 7,068,645 B1
APPLICATION NO. : 09/824837
DATED : June 27, 2006
INVENTOR(S) : Phadnis et al.

It is certified that error appears in the above-identified patent and that said Letters Patent is hereby corrected as shown below:

Col. 1, line 14, replace "excommunication" with --communication--.

Col. 4, line 31, delete "to" after the word "encapsulated".

Col. 6, line 51, delete "also" after the word "software".

Signed and Sealed this

Twenty-sixth Day of September, 2006

JON W. DUDAS
*Director of the United States Patent and Trademark Office*